(12) United States Patent
League et al.

(10) Patent No.: US 7,731,630 B2
(45) Date of Patent: Jun. 8, 2010

(54) CALIBRATION SYSTEM FOR HYDRAULIC TRANSMISSION

(75) Inventors: Richard B. League, Peoria, IL (US);
Joseph A. Grove, Mapleton, IL (US);
Todd R. Kabrich, Creve Coeur, IL (US)

(73) Assignee: Caterpillar Inc., Peoria, IL (US)

( * ) Notice: Subject to any disclaimer, the term of this patent is extended or adjusted under 35 U.S.C. 154(b) by 626 days.

(21) Appl. No.: 11/672,795

(22) Filed: Feb. 8, 2007

(65) Prior Publication Data

US 2008/0194384 A1 Aug. 14, 2008

(51) Int. Cl.
*F16H 61/00* (2006.01)
*G06F 7/00* (2006.01)

(52) U.S. Cl. .......................... 477/155; 477/906; 701/58

(58) Field of Classification Search .................. 477/115, 477/143, 153, 154, 155, 906; 701/57, 58, 701/59, 60; 73/115.02
See application file for complete search history.

(56) References Cited

U.S. PATENT DOCUMENTS

| | | | |
|---|---|---|---|
| 4,081,065 A | 3/1978 | Smyth et al. | |
| 4,646,891 A | 3/1987 | Braun | |
| 4,899,858 A | 2/1990 | Cote et al. | |
| 4,930,081 A | 5/1990 | Dunkley et al. | |
| 4,967,385 A | 10/1990 | Brekkestran et al. | |
| 4,989,471 A | 2/1991 | Bulgrien | |
| 5,046,178 A | 9/1991 | Hibner et al. | |
| 5,053,960 A | 10/1991 | Brekkestran et al. | |
| 5,070,747 A * | 12/1991 | Lentz et al. | 477/149 |
| 5,082,097 A | 1/1992 | Goeckner et al. | |
| 5,086,889 A | 2/1992 | Nobumoto et al. | |
| 5,224,577 A | 7/1993 | Falck et al. | |
| 5,249,658 A | 10/1993 | Goeckner et al. | |
| 5,316,116 A | 5/1994 | Slicker et al. | |
| 5,337,871 A | 8/1994 | Testerman | |
| 5,337,874 A | 8/1994 | Oltean et al. | |
| 5,551,930 A | 9/1996 | Creger et al. | |
| 5,580,332 A | 12/1996 | Mitchell et al. | |
| 5,624,350 A | 4/1997 | Bates | |
| 5,842,375 A | 12/1998 | Reeves et al. | |
| 5,853,076 A | 12/1998 | McKee et al. | |
| 5,950,789 A | 9/1999 | Hosseini et al. | |
| 5,951,615 A * | 9/1999 | Malson | 701/57 |
| 5,961,422 A | 10/1999 | Yasue et al. | |
| 6,022,295 A | 2/2000 | Liu | |
| 6,023,988 A | 2/2000 | McKee et al. | |
| 6,039,674 A | 3/2000 | Dourra et al. | |
| 6,088,645 A | 7/2000 | Kawasaki et al. | |

(Continued)

FOREIGN PATENT DOCUMENTS

DE  10 2004 061 079  6/2006

(Continued)

*Primary Examiner*—Roger Pang
(74) *Attorney, Agent, or Firm*—Leydig Voit & Mayer, Ltd

(57) ABSTRACT

A calibration system for calibrating a transmission adjusts a clutch fill pulse width and hold level current for an oncoming clutch via calibration shifts during operation of the associated machine, thus establishing the desired shift timing and duration. The pulse width is calibrated based on torque transfer characteristics of the clutch during a test shift, and the hold level current is calibrated based on the shift duration of a further test shift.

16 Claims, 8 Drawing Sheets

U.S. PATENT DOCUMENTS

| | | |
|---|---|---|
| 6,115,661 A | 9/2000 | Hosseini et al. |
| 6,117,048 A * | 9/2000 | Toyama ..................... 477/180 |
| 6,119,072 A | 9/2000 | Eastman |
| 6,216,074 B1 * | 4/2001 | Hillman et al. ............... 701/51 |
| 6,243,637 B1 | 6/2001 | Minowa et al. |
| 6,292,732 B1 | 9/2001 | Steinmetz et al. |
| 6,295,497 B1 | 9/2001 | Kuras |
| 6,309,325 B1 | 10/2001 | Baer |
| 6,368,249 B1 | 4/2002 | Hubbard |
| H2031 H | 6/2002 | Harrell et al. |
| 6,415,213 B1 | 7/2002 | Hubbard et al. |
| 6,488,138 B1 | 12/2002 | Baur et al. |
| 6,494,810 B1 | 12/2002 | Mack et al. |
| 6,569,060 B2 | 5/2003 | Rosi et al. |
| 6,577,940 B2 * | 6/2003 | Saito et al. .................... 701/59 |
| 6,640,178 B2 | 10/2003 | Wakamatsu et al. |
| 6,785,598 B2 | 8/2004 | Schiele |
| 6,799,108 B2 | 9/2004 | Aldrich, III et al. |
| 6,840,890 B2 | 1/2005 | Mack et al. |
| 7,115,069 B2 * | 10/2006 | Soliman et al. ............. 477/143 |
| 2002/0058570 A1 * | 5/2002 | Steinhauser et al. ......... 477/143 |
| 2005/0107936 A1 * | 5/2005 | Keyse et al. .................. 701/58 |
| 2006/0089775 A1 * | 4/2006 | Whitton et al. ............... 701/51 |

FOREIGN PATENT DOCUMENTS

| | | |
|---|---|---|
| JP | 2006-207602 | 8/2006 |
| WO | WO 97/28389 A1 | 7/1997 |

\* cited by examiner

CALIBRATION SYSTEM FOR HYDRAULIC TRANSMISSION

TECHNICAL FIELD

The present disclosure relates generally to systems and methods for calibrating a hydraulic transmission and, more particularly, to systems and methods for calibrating the flow of a pressurized operating medium within a clutch-controlled transmission.

BACKGROUND

Fluid-operated clutches (e.g., clutches operated by hydraulic or synthetic oil or other pressurized fluid) are generally well known and can be found in many systems and devices. Such clutches are hereinafter referred to as "hydraulic clutches." One primary use for the hydraulic clutch is to provide shifting between differing input/output gear ratios within a power transmission. Typically, a transmission includes an input shaft and an output shaft, as well as one or more trains of interrelated gear elements usable to selectively couple the input and output shafts. The selection of a gear ratio at the output shaft is executed via one or more clutches that affect the rotations and/or interrelationships of the gear elements. The clutches are typically hydraulically driven to engage band or disk torque transfer elements.

Shifting from one gear ratio to another normally involves releasing or disengaging an off-going clutch or clutches associated with the current gear ratio and applying or engaging an oncoming clutch or clutches associated with the desired gear ratio. Although many different clutch arrangements are possible within such transmissions, an arrangement that provides the greatest simplicity is a two-clutch shifting transmission. In this arrangement, only two clutches are actuated for a given shift regardless of the number of clutches in the transmission. In other words, a shift is executed by deactivating a single "off-going" clutch and activating a single "oncoming" clutch.

Each hydraulic clutch is typically controlled via an electrically controlled solenoid valve. The solenoid valves are electrically modulated to control hydraulic fluid pressure to the clutch and hence to control the clutch movement (e.g., in the absence of contact) and pressure (e.g., during contact).

In general terms, the clutches within a transmission are controlled both with respect to the engagement force of individual clutches as well as the timing or phase between clutch activation, e.g., between dropping an off-going clutch and activating an oncoming clutch. The force and phase with which the transmission clutches are manipulated greatly impact the resulting shift quality. For example, if the off-going clutch disengages prematurely, the engine speed may surge momentarily before the oncoming clutch begins torque transfer, resulting in a rough shift. Similarly, if the oncoming clutch engages prematurely, a suboptimal shift can result. In addition to creating an unpleasant user experience, poorly executed shifting can also impact the efficiency and service life of the transmission. To this end, it is desirable to calibrate the clutches of a hydraulic transmission.

One known method for calibrating transmission clutches is shown in U.S. Pat. No. 5,737,979 to McKenzie et. al entitled "Method of Calibrating Clutches in a Transmission." This and similar methods for calibrating transmission clutches require that the machine remain immobile for an extended period of time. During this idle time, an automated process cycles each of the various clutches through a sequence of steps, checks their operation, and adjusts clutch parameters. Such calibration processes therefore delay the deployment of the machine and consume operator time supervising the machine during the calibration.

Accordingly, there is a need for a transmission clutch control system that provides effective, convenient, and unobtrusive calibration during normal operation of a machine in order to generally enhance transmission usability and longevity.

BRIEF SUMMARY

This disclosure describes, in one aspect, a method of calibrating a hydraulic transmission for a machine. The transmission is driven by an engine and includes an input shaft and an output shaft and a plurality of selectable gear ratios for altering a transmission ratio between the input shaft and output shaft, and a plurality of hydraulic clutches operable to select one of the gear ratios when actuated. At least one shift is initiated between a first gear ratio selected by a first one of the hydraulic clutches and a second gear ratio selected by a second one of the hydraulic clutches. A pulse width for filling the second of the hydraulic clutches is calculated based on torque transfer characteristics of the transmission during the shift. A hold level current is determined for the second of the hydraulic clutches based on a measure of duration of a shift. A subsequent shift between the first and second gear ratios is then executed by applying a fill pulse of the determined pulse width to fill the second one of the hydraulic clutches and applying the determined hold level current.

In another aspect, a computer-readable medium is disclosed having computer-executable instructions for calibrating a transmission associated with a machine. The transmission has an input and an output and a number of selectable gear ratios between the input and output. The computer-executable instructions include instructions for initiating a first test shift and a second test shift between a first gear ratio and a second gear ratio during operation of the machine. The computer-executable instructions further include instructions for determining a first shift parameter based on torque transfer characteristics of the transmission during the first test shift and instructions for determining a second shift parameter based on a measure of duration of the second test shift. Finally, in this aspect, the computer-executable instructions include instructions for executing a subsequent shift between the first and second gear ratios by applying the first and second shift parameters.

In yet another aspect, an automatically calibrated transmission system for a machine is disclosed. The transmission includes an input shaft and an output shaft and a number of selectable gear ratios between the input shaft and output shaft. The transmission further includes a number of clutches, each having a piston and being operable to select one of the plurality of selectable gear ratios, as well as a number of solenoid valves associated with the clutch pistons for controlling the clutch. A control module of the transmission system is electrically linked to the solenoid valves for driving the valves. Finally, a computer-readable memory that is electrically accessible to the control module includes computer-executable instructions for initiating a number of calibration shifts, calibrating a fill pulse width for a clutch based on the torque transfer characteristics of the transmission during one of the calibration shifts, and calibrating a hold level current for the clutch based on a duration of another shift.

DETAILED DESCRIPTION

The disclosure relates to a system and method for the calibration of hydraulic clutches within a hydraulic transmission. The described technique entails calibrating both the oncoming clutch pulse width signal and the oncoming clutch hold level current during actual operation of the associated machine, e.g., without requiring that the machine remain idle during calibration.

A hydraulic clutch actuator typically comprises a movable element, e.g., a piston within a chamber. The movable element will typically need to move a finite distance prior to causing initial contact between two torque transfer surfaces or elements. The period during which pressurized fluid is introduced into the chamber to cause such movement is generally referred to as the clutch "fill" period. This period is controlled electronically via the application of a pulse signal to a solenoid valve associated with the clutch chamber. The pulse signal has a duration, also referred to as the pulse "width." Once the clutch is filled and the torque transfer elements are in contact, the rate of introduction of fluid into the chamber is reduced to a "hold" level while the degree of torque transfer gradually increases. (See, e.g., FIG. 8, level $P_H$ of pressure trace $C_{OC}$ (805)). The hold level is set via a hold level current applied to the associated solenoid valve.

Calibration of the pulse width value and hold level current allows for smoother shifts. This not only provides an improved operator experience, but also potentially improves transmission life by minimizing drive train shock due to overly short shifts as well as heat generation due to overly long shifts.

Figure 1:
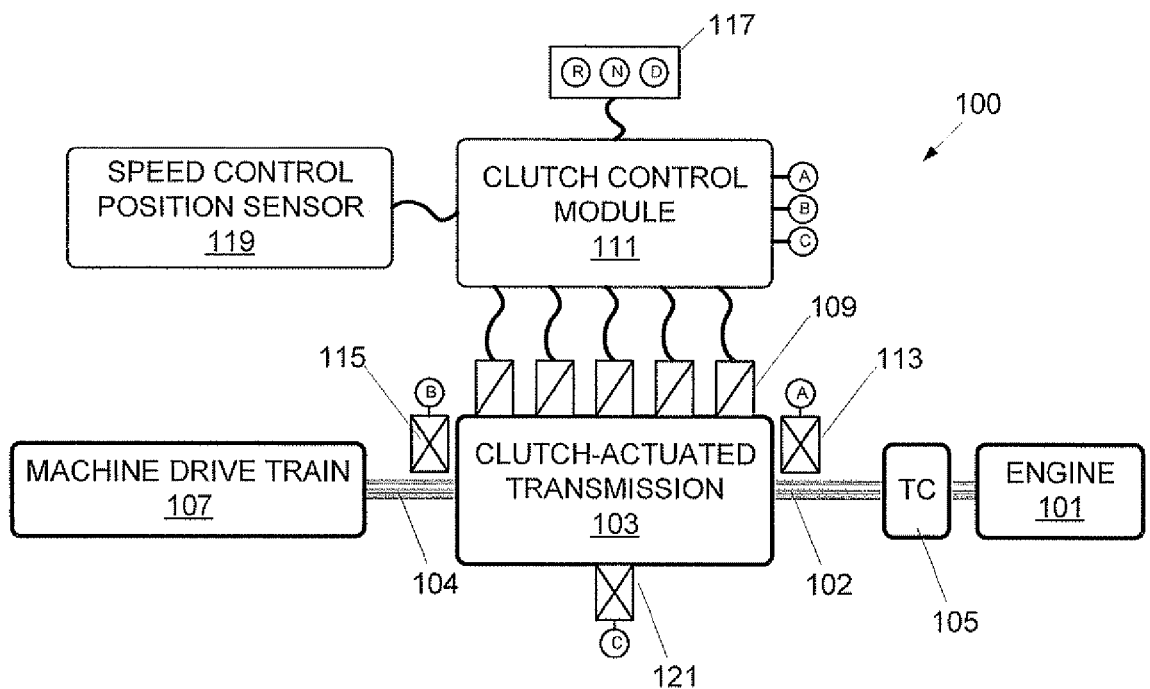
FIG. 1 is a schematic view of a machine transmission system including a machine power train, transmission, and related control system.

Referring now to the drawings, FIG. 1 schematically illustrates an automatic transmission system 100 including a machine power train and related control system. The power train comprises a prime mover, such as an internal combustion engine 101, coupled to an input 102 of a fluid transmission 103 via a clutch or torque converter 105. The output 104 of the transmission 103 is in turn linked to a machine drive train 107, e.g., to drive an axle for movement of the machine.

In overview, the transmission 103 comprises a plurality of hydraulic clutches (shown in greater detail in FIG. 2) associated with gear elements or gear element sets within the transmission 103 to execute gear shifts. Each of the plurality of clutches comprises a positive displacement cylinder and piston arrangement. The clutches are controlled by a series of dedicated solenoid valves 109, sometimes referred to as "electro-hydraulic" valves. In the illustrated embodiment, each solenoid valve 109 responds to an applied current level to supply hydraulic fluid to the associated clutch at a pressure correlated to the applied current. The resulting pressure may also be limited by the supply pressure and by any flow limitations, such as those caused by an orifice in the flow path.

The solenoid valves are in turn controlled by an electronic clutch control module 111. In particular, the electronic clutch control module 111 selectively applies current signals to the solenoid valves 109 to selectively engage and disengage various clutches to execute a desired shift. In addition to certain shifts that may take place automatically, the control module 111 also receives input from a user-actuated shift selector 117 in one example. For example, the operator can use the selector 117 to select a forward, reverse, or neutral state.

The timing of an automatic shift operation depends largely on the rotational speeds of the input 102 and output 104 shafts of the transmission 103. To this end, speed sensors 113, 115 are located adjacent shafts 102, 104 respectively, and their respective outputs A, B are linked to the electronic clutch control module 111.

The shift timing and execution are also affected by other factors such as speed control position (e.g., accelerator pedal position) and transmission oil temperature. Thus, the electronic clutch control module 111 also receives inputs from a speed control position sensor 119 and a transmission oil temperature sensor 121, as well, potentially, as other machine-related sensors. The sensors described herein may be conventional sensors such as potentiometers, thermistors, optical or magnetic speed pickups, and so on.

The electronic clutch control module 111 comprises a computing device such as a microprocessor, programmable logic array (PLA) or programmable logic controller (PLC) (hereinafter, collectively "processor"). Either as part of the computing device or in association with it, the electronic clutch control module 111 also comprises clocking facilities, data inputs, memory, control outputs, and current drivers associated with the control outputs for driving the solenoids 109. It will be appreciated that the processor of the electronic clutch control module 111 operates via execution of computer-readable instructions, e.g., software, stored on a computer-readable medium such as an electrical, magnetic, or optical medium.

Typically, each solenoid valve 109 responds proportionally to an applied current. As such, in one example, the control outputs of the current drivers are digital pulse width modulated (PWM) signals representing on average a desired current signal. This allows the electronic clutch control module 111 to control the clutch pressure in a proportional manner via appropriate command signals to the solenoid drivers.

In operational overview with respect to the illustration of FIG. 1, the electronic clutch control module 111 monitors the input and output shaft speeds of the transmission 103 via the respective sensors 113, 115. When the input shaft speed exceeds a higher threshold (or falls below a lower threshold), the electronic clutch control module 111 responsively controls the solenoid valves 109 to execute an up-shift or a downshift as appropriate. The higher and lower thresholds may be predetermined, but need not be in every case.

The transmission 103 in this instance is shifted between adjacent gear ratios by releasing a single off-going clutch and engaging a single oncoming clutch. Thus, during any given shift, most of the solenoid valves 109 will remain inactive (i.e., not providing a flow of pressurized fluid to the associated chamber), with their associated clutches thus disengaged. In an example, there are five clutches in transmission 103 that are used for shifting. However, a greater or lesser number of clutches may be used depending upon the intended application and designer preferences.

When activating an oncoming clutch given existing off-going clutch characteristics, a pulse value and hold level current are used to control the timing and duration respectively of the shift. Calibration of these values allows for smoother shifts, potentially yielding a better operator experience and improved transmission life.

Figure 2:
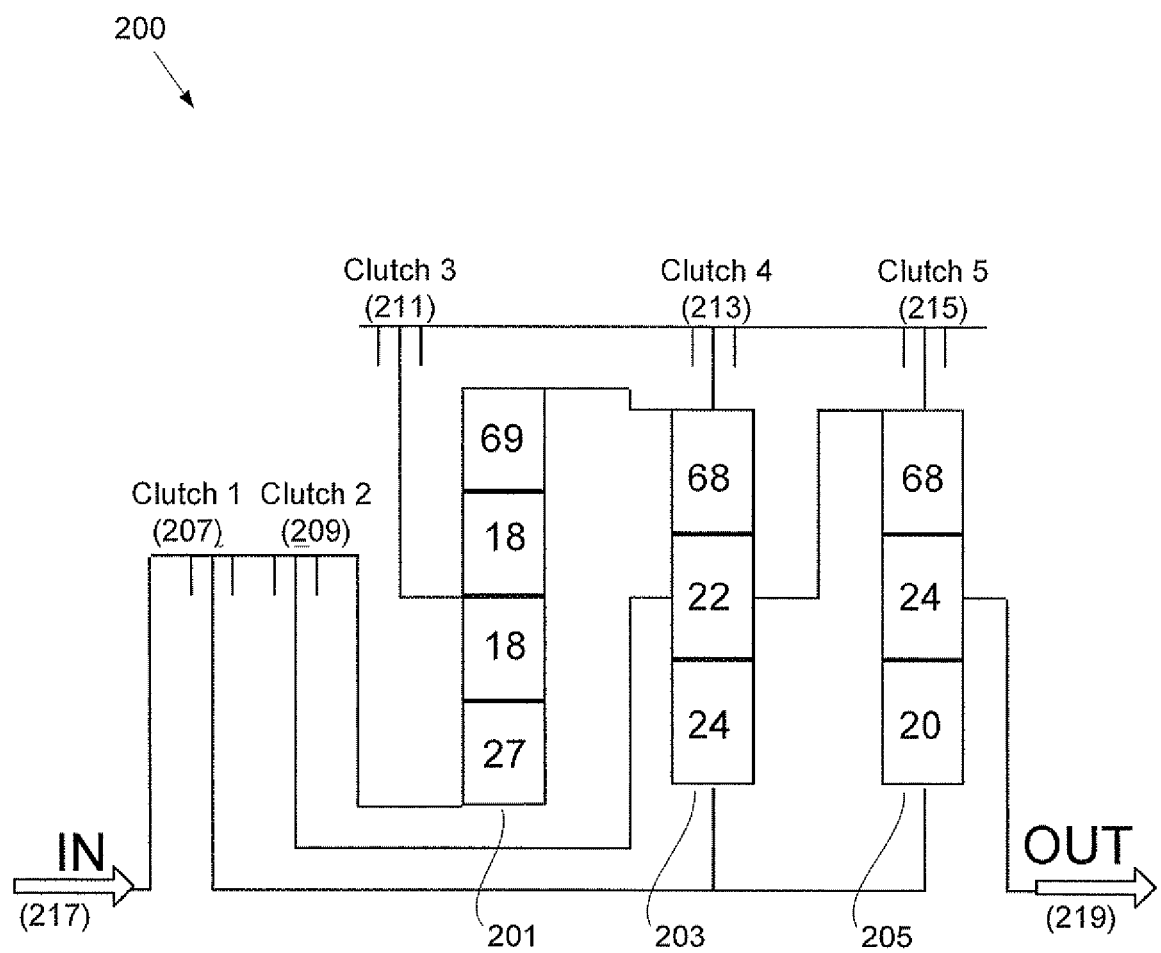
FIG. 2 is a schematic view of a machine transmission usable within the transmission system of FIG. 1.

For the convenience of the reader, FIG. 2 illustrates an example of a transmission 200 usable within embodiments of the disclosed system. It will be appreciated that the example of FIG. 2 is simply illustrative, and is not intended to limit the scope of the invention. Any other suitable type and/or configuration of transmission may instead be used in keeping with the principles disclosed herein.

The illustrated transmission 200 is a 3-train 5-clutch automatic transmission. In particular, the transmission 200 comprises a first train (i.e., a single set of two or more permanently meshed gears) 201, a second train 203, and a third train 205. Each train in the illustrated example includes at least 3 gear positions (sun, planet, ring) and an even greater number of individual gears. As shown, the first train 201 is a double planetary train comprising a sun gear with 27 teeth, two planet gears per position (e.g., three sets of two gears surrounding the sun gear) of 18 teeth each, and a ring gear of 69 teeth. The second train 203 is a single planetary train comprising a sun gear with 24 teeth, one planet gear per position of 22 teeth, and a ring gear of 68 teeth. The third train 205 is also a single planetary train and comprises a sun gear with 20 teeth, one planet gear per position of 24 teeth, and a ring gear of 68 teeth.

The trains 201, 203, 205 are interrelated via a set of clutches including a first clutch 207, a second clutch 209, a third clutch 211, a fourth clutch 213, and a fifth clutch 215. These clutches may be but need not be hydraulic clutches. Since the illustrated example 200 is a single clutch shifting system, the clutches are activated one at a time to select different gear ratios available between the transmission input 217 and output 219. For example, if clutch 3 (211) is activated (and the remaining clutches are not), the carrier of the double planet gears of the first train (201) are fixed by clutch 3 (211), and the resultant gear ratio between the input 217 and the output 219 is different than if another clutch were instead activated.

In an example described hereinafter, the electronic clutch control module 111 implements a method of automatic clutch calibration. The clutch calibration process adjusts the parameters of the clutch-filling pressure pulse as well as the hold level current employed after filling is complete but before lock-up (e.g., zero slippage) is attained. The method receives input including the machine engine speed, torque converter output speed, and the transmission output speed. The method derives calibrated pulse widths and hold level currents for each clutch, and records these values in one or more calibration tables or otherwise stores the values (e.g., in appropriate maps, models, formulae, etc.) as will be appreciated by those of skill in the art. In one example, calibrations are performed for each clutch at each of three engine RPM ranges (e.g., non-overlapping ranges centered at around 600 rpm, 900 rpm, and 1200 rpm). The engine speed will frequently correspond substantially to the speed of the transmission input shaft 102, especially when the converter 105 employs a lock-up mechanism. Nonetheless, a separate engine speed sensor may be employed.

Calibration may be periodically necessary or desirable, e.g., when the clutches have never been calibrated and when calibrated clutch tolerances or characteristics have been altered by major maintenance or parts replacement. The pulse width calibration procedure executes during full-throttle (speed control) up-shifts and coasting down-shifts based on the onset of ratio change. The hold level current calibration executes during coasting downshifts based on shift duration.

Figure 3:
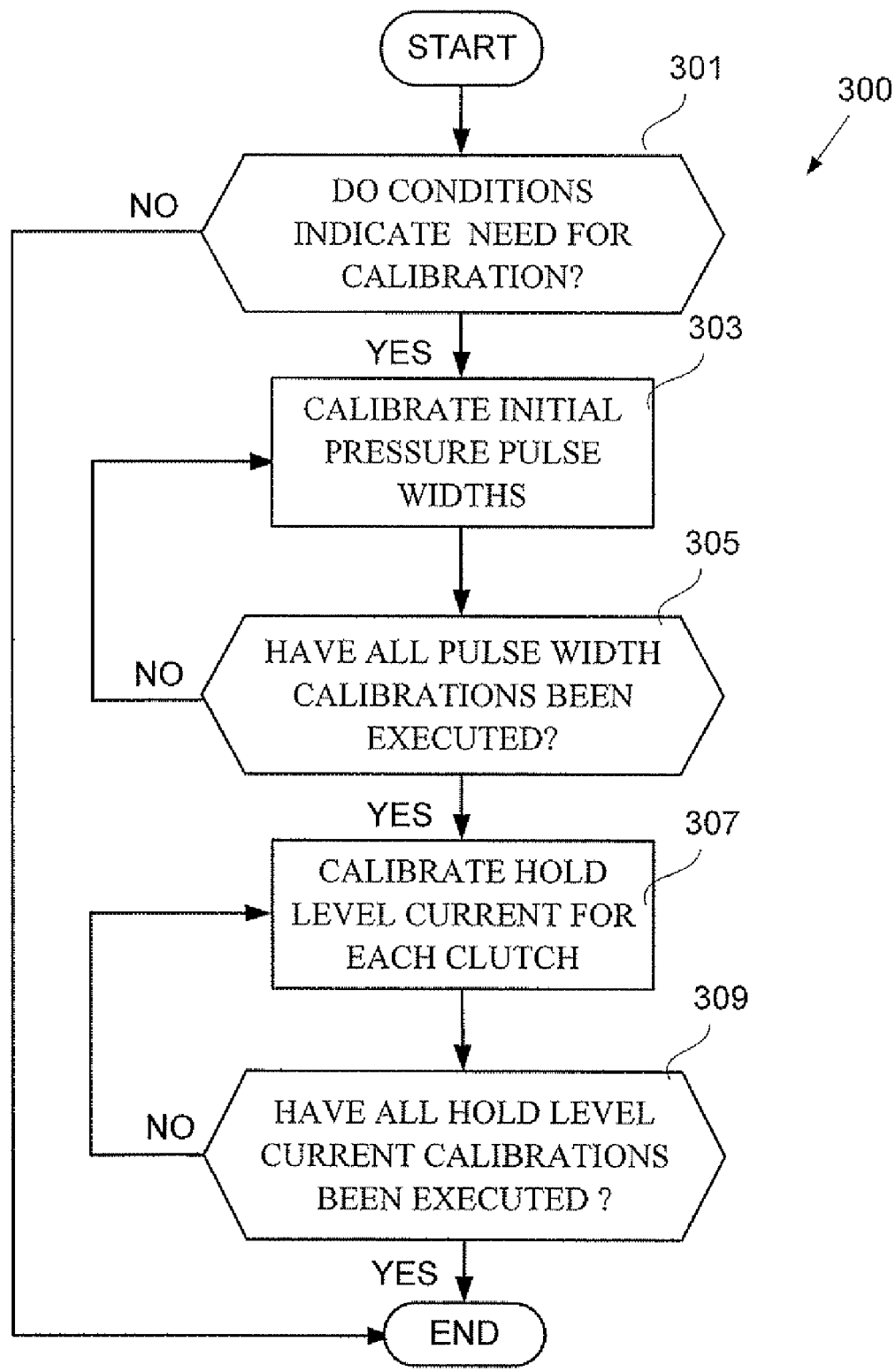
FIG. 3 is a flow chart illustrating a clutch calibration process in overview according to an example of the disclosed system.

The flow chart of FIG. 3 illustrates a process 300 in overview according to an example for automatically calibrating the clutch of a transmission during operation of the machine. The described process may be carried out in any suitable manner, but in an example, a computer-readable medium accessible to the electronic clutch control module 111 is encoded with computer-executable instructions for performing the steps of the process. The derived calibrated values may be stored in tabular or other form, and may be stored on the same computer-readable medium that bears the computer-executable instructions or on a different memory medium. Although the flow-chart of FIG. 3 describes sequential computational and operational steps executable by way of traditional computing techniques, those of skill in the art will appreciate that many of these steps may alternatively be implemented via other suitable procedures such as neural computational techniques.

At stage 301, the controller, e.g., the electronic clutch control module 111, determines whether a condition exists that indicates a need for calibration. Such conditions include, for example, a lack of prior calibration in a new machine, a detected shift anomaly, and a manual reset of the system. Such conditions are reflected, in one example, by setting an appropriate flag that is readable by the controller.

If it is determined at stage 301 that calibration is not required, the process terminates. Otherwise, at stage 303, the process calibrates an initial pressure pulse width for each of the plurality of clutches at each of a selected range of engine RPM values. For example, for a five clutch transmission being calibrated at each of three RPM values, fifteen calibrations will be performed at stage 303. A more detailed process for executing the pulse width calibration is illustrated in FIG. 4.

At stage 305, the process determines whether all pulse width calibrations have been executed, and if not returns to stage 303. Otherwise, the process flows to stage 307. Alternatively, if one or more pulse calibrations are designated as unneeded or remain unavailable (e.g., consecutive tests fail to converge within a predetermined number of shifts), the process may flow to stage 307 without completing all pulse calibrations.

At stage 307, the process calibrates the hold level current level for each clutch. At stage 309, the process determines whether all hold level current calibrations have been executed. If not, the process returns to stage 307, and otherwise, the process terminates. If one or more hold level current calibrations are designated as unneeded or remain unavailable at stage 309, the process may terminate without completing all hold level current calibrations. When this occurs, a service light may be lit to alert the operator to a transmission adjustment problem, and/or a flag may be set by the control module 111 for later diagnostic purposes.

Figure 4:
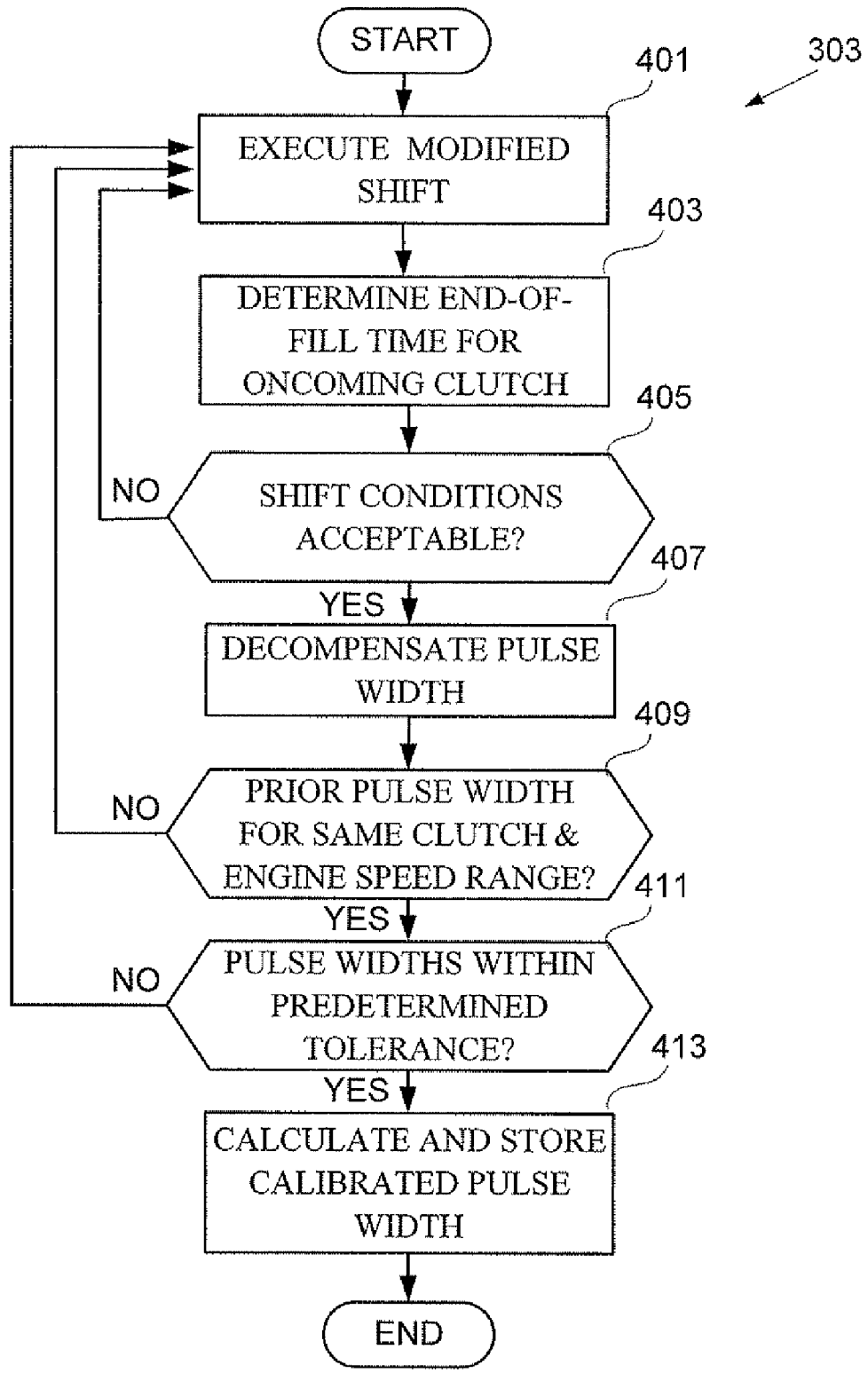
FIG. 4 is a flow chart illustrating a clutch pulse width calibration process according to an example of the disclosed system.

Turning to FIG. 4, a detailed process for executing the pulse width calibration of stage 303 is shown. At stage 401 of the process 303, the controller executes a modified shift, also referred to as a test shift or calibration shift. The controller is operable to cause shifts automatically when appropriate during calibration, as will be appreciated by those of skill in the art. However, the shifts executed during pulse calibration are modified in that the off-going clutch is dropped quickly, i.e., its pressure is released more quickly than it would be during a normal shift. This causes a torque interruption, i.e., a period when torque transfer through the transmission 103 is diminished and the rotation of the torque converter 105 output rises or flairs. During this stage, the engine speed will exhibit similar behavior. As the oncoming clutch is filled during the shift, torque transfer is restored and the torque converter 105 output peaks and then begins to fall.

Figure 5:
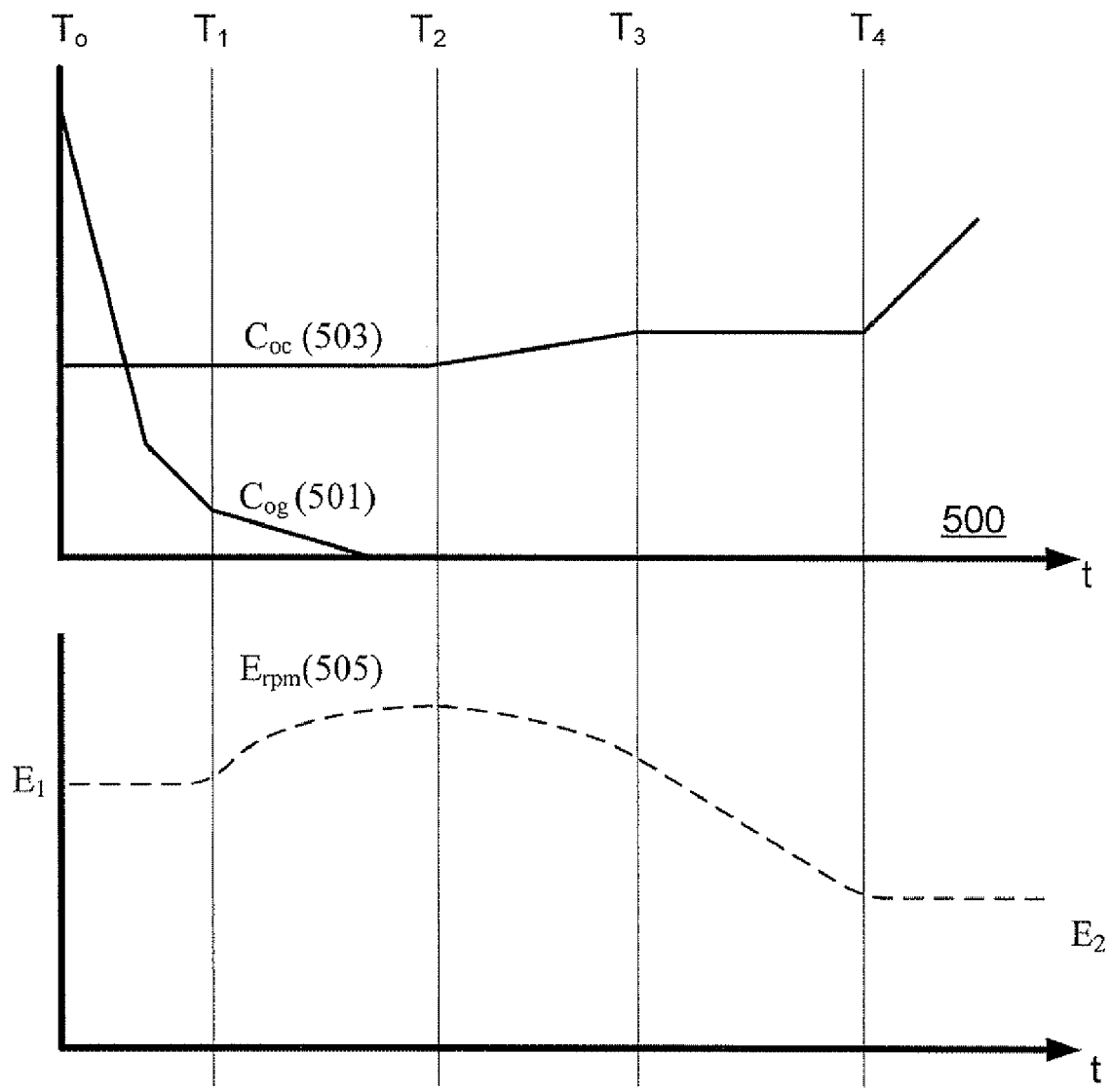
FIG. 5 is an idealized timing plot illustrating the relationship between clutch commands and engine speed during a pulse width calibration shift according to an example of the disclosed system.
Figure 6:
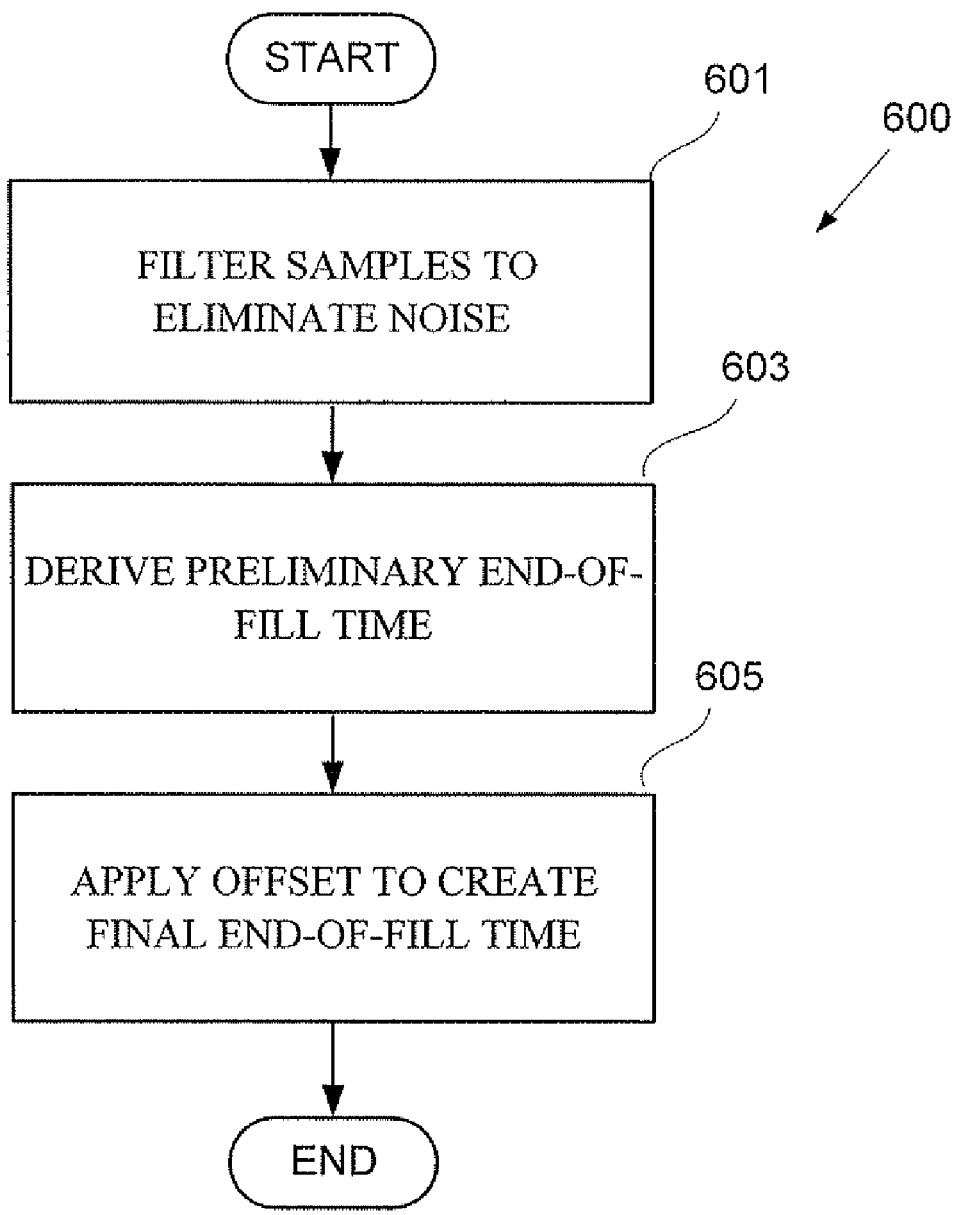
FIG. 6 is a flow chart illustrating an end-of-fill calculation process usable within various examples of the disclosed system.

The abstracted timing graph 500 of FIG. 5 illustrates this behavior. In particular, at the start of the shift ($T_0$), an engine rpm $E_{rpm}$ (505) is at an initial value of $E_1$ and the command pressure $C_{og}$ (501) of the off-going clutch is released quickly. At this time, a fill pulse begins for the oncoming clutch command pressure $C_{oc}$ (503). As the off-going clutch unlocks at point $T_1$, the oncoming clutch is still filling and has not yet "touched up" or reached a position where it begins to transmit torque. At this point, the engine speed $E_{rpm}$ (505) begins to flair due to torque interruption.

The command pressures may be any suitable pressures. However, in an example, the fluid is flow-limited by an orifice rather than pressure-limited during the fill pulse. In particular, in one embodiment, each clutch chamber comprises a 0.3 mm orifice at the supply side to limit flow. In this example, a pulse pressure of 50 PSI is used, and is sufficient to enter an orifice-limited fill regime. Limiting the flow in this manner aids in minimizing contact impact or torque spikes. In addition, the orifices aid in stabilizing the hydraulic supply. Large clutches require a substantial amount of fluid to fill, and without the orifices in place, the filling of such clutches could tax the hydraulic supply to such an extent that other hydraulic devices on the machine would receive insufficient pressure to operate properly.

As the oncoming clutch continues to fill, it touches up at point $T_2$, and restoration of torque transfer begins. At this time, the engine speed $E_{rpm}$ (505) peaks and begins to fall. Beyond point $T_2$, the oncoming clutch pressure is gradually increased until lock-up is achieved at point $T_4$.

At stage 403, the end-of-fill time of the oncoming clutch is determined based on the shift behavior as illustrated in FIG. 5. In particular, at stage 601 of process 600 the sampled speeds of the transmission input 102 and output 104 shafts are filtered to eliminate jitter or high frequency variation due to noise, e.g., electrical noise, in the system. At stage 603, the filtered speed samples are processed to produce an indication of the observed touch-up time $T_2$ and hence the end-of-fill time.

This processing may be performed in any number of ways, but in an example, the observed touch-up time is inferred by comparing the input shaft and output shaft accelerations while accounting for the intended gear ratio. For example, if the target [input speed]:[output speed] ratio is 3:1, then when the output shaft acceleration corresponds to one third of the input shaft acceleration, the transmission is not slipping substantially. At such time, the normalized value $S=[A_{in}-(R_{ab})(A_{out})]$ is substantially equal to zero ($A_{in}$ is the input shaft acceleration, $A_{out}$ is the output shaft acceleration, and $R_{ab}$ is the input/output ratio of the ending gear.)

When the input shaft acceleration exceeds the output shaft acceleration by more than the target gear ratio would predict, the transmission is slipping, and the value S exceeds zero. When the speed of the input shaft is greater than the target ratio would predict, but the acceleration of the input is moving towards what the target ratio would predict (i.e., S is decreasing), the slippage of the transmission is decreasing, presumably due to the touch-up of the oncoming clutch. Thus, when the value S is tracked as a function of time S(t), the peak of this curve during the shift, e.g., the point in time where S(t) begins decreasing toward zero, is taken to represent a preliminary end-of-fill time.

It will be appreciated that S(t) may be "noisy" or non-smooth due to sensor noise and other issues, and thus may contain many short term artifacts where S momentarily decreases. To avoid false triggering based on such artifacts, a minimum positive excursion of a predetermined magnitude in S(t) is required in one example to avoid false identification of the end-of-fill time. For example, a rise of 5% in S(t) may be used to signal a true end-of-fill time as opposed to noise, such that jitters of less than 5% would not be taken to signal the end-of-fill time.

Finally, at stage 605, the electronic clutch control module 111 applies an offset to the preliminary end-of-fill time to shift it earlier in time and create a final end-of-fill time. The offset is based on delays and variations that are inherent in the sensor system and the detection scheme (e.g., signal filtering, etc.), and may be empirically observed or estimated for any clutch. Typical offsets are less than 100 ms for a one-second shift period. The final end-of-fill time corresponds to the pulse width for the shift.

Referring again to FIG. 4, the electronic clutch control module 111 determines at stage 405 whether the shift conditions were acceptable for producing usable pulse width data. Although this determination may be based on any number of factors, in an example, the electronic clutch control module 111 considers the shift nature (e.g., sequential shift as opposed to skipped shift), the oil temperature, and the torque and/or speed control conditions. For example, if a single clutch up-shift at a normal operating oil temperature occurs at a torque of greater than 200 Nm with low speed control variation, then the shift is deemed acceptable in one example. Also by way of example, low torque rather than high torque is desired with respect to downshifts.

If the shift conditions are unacceptable, the process returns to stage 401. Otherwise, the process continues to stage 407, whereupon the electronic clutch control module 111 decompensates the pulse width for the shift to remove any embedded compensations such as engine speed corrections. For example, because engine speed can affect hydraulic supply pressure, the relationship between solenoid command signals and output pressures may not be constant. Engine speed compensation processes typically take the engine speed into account accordingly and adjust the control signal appropriately.

At stage 409, the process determines whether there has been a prior pulse width calculation for the same clutch for the same engine speed range. As noted above, it is desirable to take readings at a number of engine speeds, e.g., about 600, 900, and 1200 rpm. It will be appreciated that the engine speed will rarely match a specified speed for any length of time. Thus, in one example, the engine speed is classified into one of a plurality of non-overlapping contiguous engine speed sub-ranges that encompass an operating speed range of the engine. The operating speed range can be the entire anticipated speed range or a subset of the anticipated speed range, with engine speeds at the upper and/or lower end of the operating range omitted from the specific sub-ranges. Thus, readings for the "600 rpm" sub-range could be taken at actual engine speeds between 500 rpm and 750 rpm, "900 rpm" sub-range readings could be taken at actual engine speeds between 750 rpm and 1050 rpm, and "1200 rpm" sub-range readings could be taken at actual engine speeds between 1050 rpm and 1250 rpm.

If it is determined that there has not been a prior pulse width calculation for the same clutch and engine speed range, the process returns to stage 401. Otherwise, the process compares the current pulse width and prior pulse width in stage 411 to determine whether the pulse widths are within a predetermined tolerance of one another. The predetermined tolerance may be a percentage value, a time value, or a value specified in another manner. In one example the predetermined tolerance is a time value of 20 ms.

If it is determined that the pulse widths are not within the predetermined tolerance of one another, the process returns to stage 401. Otherwise, the process calculates and stores the average of the two pulse widths as the calibrated pulse width in stage 413 and terminates.

It is possible that the pulse width will occasionally not converge during process 303, i.e., that stage 413 will not be reached. In one embodiment, if the pulse width does not converge within a predetermined number of shifts, e.g., 5, then the clutch phasing is adjusted. In particular, accelerating or delaying the start of the pulse relative to the initiation of the pressure drop for the off-going clutch will enable the process to then converge. For example, if the pulse widths evaluated at stage 411 are consistently longer than desired, this indicates that the maximum fill rate is unable to adequately fill the clutch prior to the off-going clutch becoming completely disengaged. In this situation, initiating the oncoming pulse earlier in time will allow for more complete filling at an earlier point in time.

In a further example, the degree of flair in the transmission ratio during calibration is used to adapt the clutch phasing. For example, if the peak ratio value during the flair exceeds 125% of the value prior to onset of the flair, then the drop in command pressure for the off-going clutch is delayed. If the peak ratio value during the flair is less than 104% of the value prior to onset of the flair, then the pulse start is delayed.

Although the foregoing discussion of pulse calibration focuses primarily on positive torque up-shifts, the same principles are applicable to coasting downshifts and neutral shifts. For example, during a coasting downshift, no torque is initially transmitted. In this situation, the end-of-fill can be determined, and the pulse width calculated, based on the point at which the transmission ratio begins to change toward the new ratio.

With respect to shifts from neutral while the machine is standing still, these shifts provide calibration data for the specific clutches involved, namely one forward clutch and one reverse clutch. In particular, since the transmission is in converter drive when in neutral (i.e., the input to the torque converter is spinning with the engine and the torque converter output/transmission input is "freewheeling" because the transmission 103 is not engaged), a change in the converter ratio when the transmission is engaged in either direction signals a preliminary clutch end-of-fill time to be processed as described above. In other words, the converter output shaft will begin to slow as the transmission becomes engaged.

Certain clutches may be filled most frequently at low and intermediate engine speeds. To perform high engine speed calibration for such clutches, a tip-in shift may be used to gather calibration data. A tip-in shift occurs when the speed control actuator is moved by the user to a position that requires more power than the current gear can provide. Examples of tip-in shifts in an N-speed transmission include high throttle (speed control) N to N−1 shifts (i.e., $5^{th}$ to $4^{th}$ gear in a 6-speed transmission) and 2 to 1 shifts. Requiring tip-in shift calibration can provide improved shift performance for subsequent power down shifts.

As noted above, the clutch calibration consists of the foregoing pulse width calibration as well as a hold level current calibration. The pulse width is calculated to provide "touch up" of the clutch (e.g., the start of detectable torque transfer), at which point the system switches to a hold level current to transition from touch-up to maximum torque transfer. The hold level current must be sufficient to avoid clutch drain during hold periods. On the other hand, excessive hold level currents will cause premature lock up and overly aggressive shift behavior. Thus, hold level current calibration is important so that, after touch-up is achieved, the approach to fill lock-up is neither overly prolonged nor overly abrupt.

In an example, hold level current calibration for each clutch is executed after the pulse calibration for that clutch during coasting zero torque shifts by measuring the shift duration. In overview, if the observed shift duration falls outside of a predetermined acceptable range, i.e., it is too short or too long, the difference between the observed duration and a target duration is used to adjust the hold level current.

Figure 7:
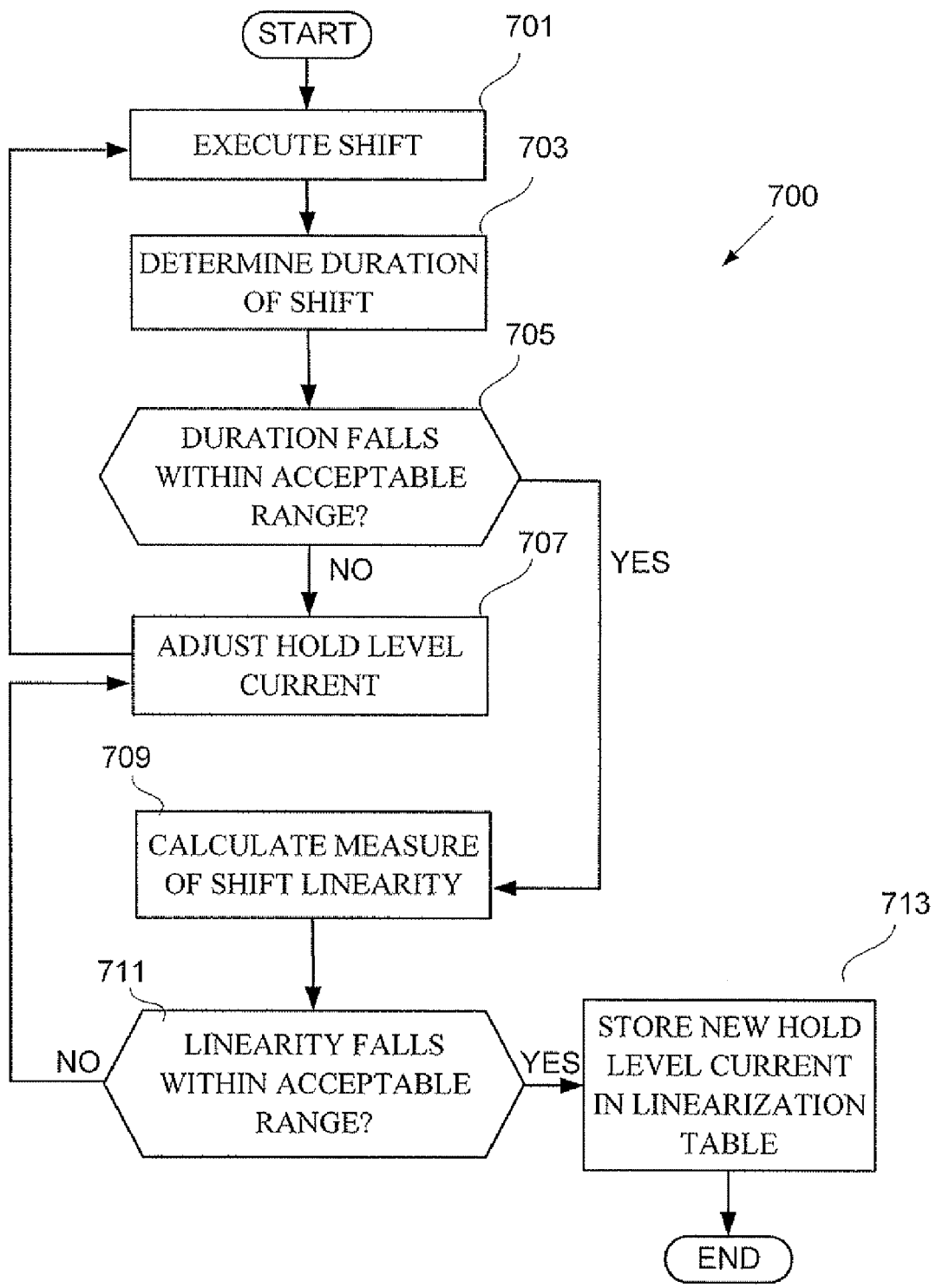
FIG. 7 is a flow chart illustrating a hold level current calibration process according to an example of the disclosed system.

FIG. 7 illustrates in greater detail a process 700 for executing the hold level current calibration as in stage 307 of FIG. 3. At stage 701 of the process 700, the controller executes a shift using an appropriate fill pulse derived during the pulse calibration phase, and a hold level current. This shift may similarly be referred to as a test shift or calibration shift. During the first iteration of the process, the hold level current is set to a default level. During hold level current calibration shifts, the off-going clutch phasing is normal rather than premature.

At stage 703, the process determines the duration of the test shift. While the locked regimes on either side of a shift can be readily identified, the transition during the shift is more difficult to quantify. In an embodiment, the shift duration is measured as the time between the point whereat 5% of the final ratio change has occurred and the point whereat 75% of the change has occurred.

At stage 705 it is determined whether the observed shift duration falls within a predetermined acceptable range. Overly rapid shifts can be perceptibly rough, while prolonged shifts can lead to heat generation and frictional wear. In an embodiment, the target shift duration is set at 0.8 sec with a range of ±0.1 second; however the target duration may alternatively be any suitable number or range according to desired application or other factors.

If the observed shift duration falls within the acceptable range, the process flows to stage 709. Otherwise, the hold current level is adjusted in stage 707. After the adjustment in stage 707, the process returns to stage 701 where the shift is executed, when needed, with the adjusted hold value. In the event that the duration is acceptable, a measure of the linearity of the shift is calculated at stage 709. In an example, the linearity measure is a weighted ratio of the time consumed to reach a 5% change in the transmission ratio ($T_5$) and the time consumed to reach a 75% change in the ratio ($T_{75}$). The starting point for measurement of the time consumed may be any suitable point, but in an example, the attainment of substantially zero applied pressure (e.g., 2% of peak applied pressure) in the off going clutch chamber marks the start of the time measurement. In an example, the measurement of linearity is $(15T_5)/(T_{75})$.

At stage 711, it is determined, based on the measurement of linearity, whether the shift was linear. For example, if $X<(15T_5)/(T_{75})<Y$ does not hold, then the shift is flagged as non-linear. The unit-less limits X and Y may be any suitable values, and in an example are set at 0.8 and 1.2 respectively. If the shift is nonlinear, the process flows to stage 707 whereupon the hold current is adjusted before the process returns to stage 701.

In both cases, whether the shift is of unacceptable duration or of acceptable duration but unacceptable linearity, the hold level current is adjusted in stage 707 in a direction so as to move the duration or linearity towards the acceptable range. During the first iteration of the process, the hold level current is adjusted by a default gain. The default gain may be any desired fractional amount, but is preferably less than about 10% (i.e., a multiplication by 110% or 90%). During subsequent iterations, the previous hold level currents, duration values, and/or linearity values are used to derive a clutch-specific gain. In other words, the expected effect of the default gain on these values is known after the first iteration, and the effects of other gains can now be predicted, e.g., via extrapolation or otherwise.

With respect to the direction of the adjustment, increases in hold level current tend to decrease shift duration. Thus, the hold level current is increased if the shift duration is longer than the upper limit of the acceptable range and is decreased if the shift duration is less than the lower limit of the acceptable range. With respect to linearity, decreased hold level currents tend to increase linearity at the expense of increased duration. When acceptable linearity cannot be achieved within an acceptable shift duration, it has been found that the most likely cause is a preexisting under-filling of the clutch. Thus, if this occurs, the pulse width is lengthened to increase clutch filling and the process 700 is repeated.

If instead at stage 711 it is determined that the linearity is acceptable, the process flows to stage 713. At stage 713 the new hold level current value is stored in a linearization table and the calibration process terminates for that clutch.

Figure 8:
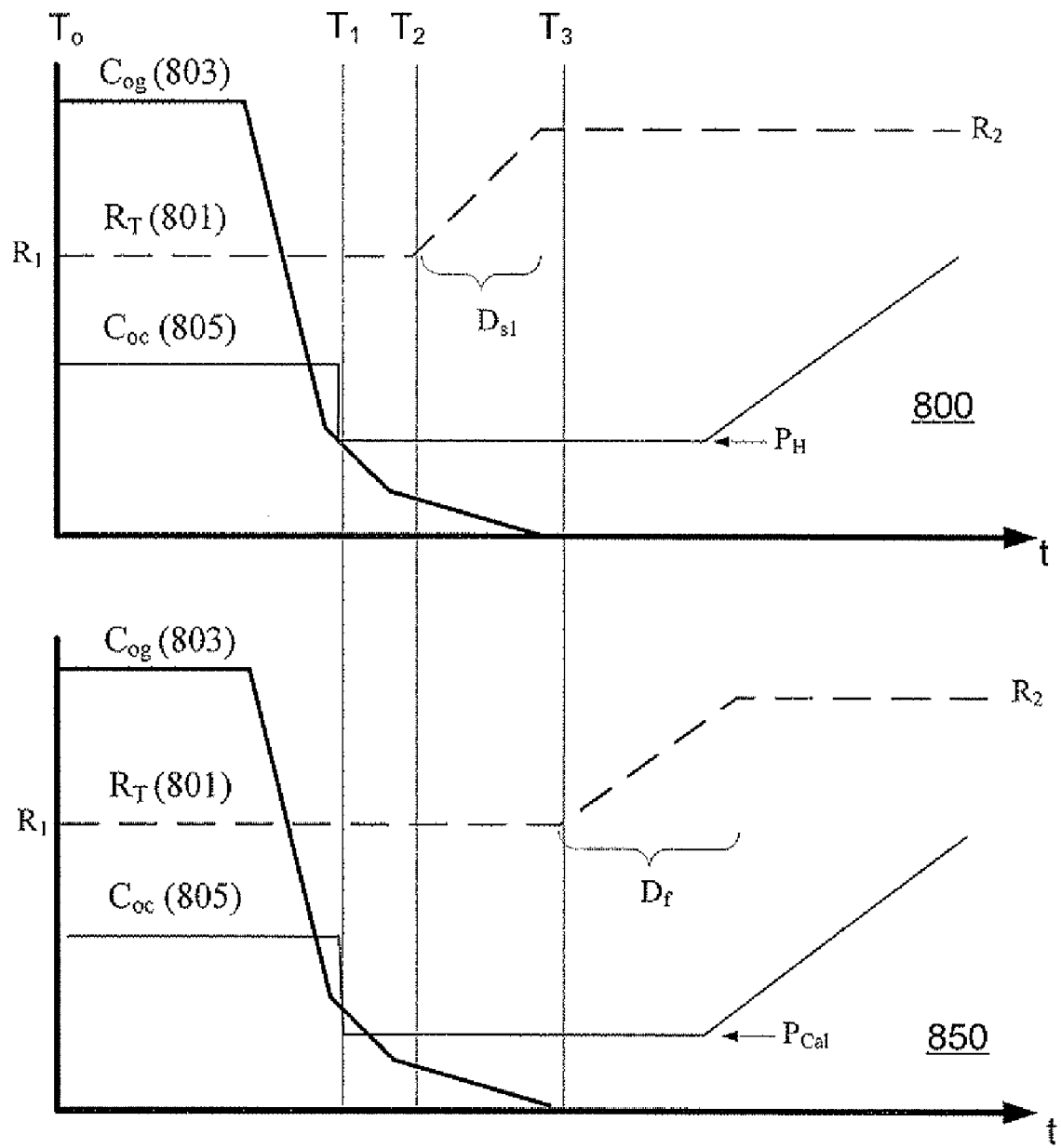
FIG. 8 is an idealized timing plot illustrating the affect of hold level current calibration on shift transition timing and duration according to an example of the disclosed system.

The abstracted timing graphs 800 and 850 of FIG. 8 illustrate the effect of hold level current adjustment and calibration on shift characteristics. In particular, graph 800 illustrates a shift prior to calibration. At the start of the shift ($T_0$), the transmission ratio $R_T$ (701) is at an initial value of $R_1$ and the command pressure $C_{og}$ (803) of the off-going clutch is stable at a relatively high pressure, locking the off-going clutch. At this time, a fill pulse also begins for the oncoming clutch command pressure $C_{oc}$ (805).

The fill pulse ends at point $T_1$, and the hold level current cycle of value $P_H$ begins. Shortly thereafter at point $T_2$, a shift transition of duration $D_{s1}$ occurs and the transmission ratio $R_T$ (801) rises to 2. The shift duration $D_{s1}$ is less than a predetermined minimum $D_{min}$. Therefore, the calibration process multiplies the hold level $P_H$ by a less than unitary gain factor to prolong the shift duration. This process may be iterated a number of times if necessary, until the final shift duration $D_f$ exceeds the minimum $D_{min}$ and is less than the maximum $D_{max}$.

Having calibrated a particular clutch as an oncoming clutch between a first and second gear ratio, subsequent shifts between the first and second gear ratios are executed by applying a fill pulse of the derived pulse width to the clutch solenoid valve to fill the oncoming clutch after which the derived hold level current is applied to the clutch solenoid. A calibrated shift is illustrated in the abstracted timing graph 850 of FIG. 8. In particulars the characteristics of the shift are similar to that of graph 800 until the fill pulse ends at point $T_1$. At this point, the hold level current cycle at the lower final calibrated hold value $P_{Cal}$ begins. At point $T_3$ a shift transition of duration $D_f$ occurs and the transmission ratio $R_T$ (801) rises to $R_2$.

INDUSTRIAL APPLICABILITY

The industrial applicability of the clutch calibration system described herein will be readily appreciated from the foregoing discussion. A technique is described wherein both the oncoming clutch pulse width and the oncoming clutch hold level current of a hydraulic clutch are calibrated during actual operation of the machine. Unlike some existing clutch calibration systems, which require idling of the machine for an extended period to provide similar quality calibration, the calibration system of the present disclosure is able to calibrate the timing and duration of shifts during operation of the machine via detection of end-of-fill and transition duration values and adjustment of the clutch solenoid valve command currents. Optimal shifting of power transmissions can thus be realized automatically, effectively, and without service interruption.

The present disclosure is applicable to transmissions having hydraulic clutches (sometimes referred to as "hydraulic transmissions") such as may be used in heavy duty vocational machines. For example, heavy industrial machines, construction day cab trucks, refuse collection trucks, dump trucks, mixers, heavy haul tractors and so on may benefit from application of the teachings herein. In such machines, application of the foregoing teachings can provide improved user experience through smoother shifting as well as improved drive train longevity through lower frictional wear and impulse stresses.

The described system allows the operator of such a machine to use the machine for its intended recreational or vocational purpose, while the calibration of the transmission clutches occurs automatically and unobtrusively. Thus, for example, a refuse truck that is newly manufactured or that has undergone major transmission work may nonetheless be immediately placed into service without calibration. Despite the lack of prior calibration, the transmission will progressively automatically calibrate itself during the course of operation to improve transmission longevity and operator experience.

It will be appreciated that the foregoing description provides examples of the disclosed system and technique. However, it is contemplated that other implementations of the disclosure may differ in detail from the foregoing examples. All references to the invention or examples thereof are intended to reference the particular example being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method of calibrating a hydraulic transmission for a machine, the transmission being driven by an engine and having an input shaft and an output shaft and a plurality of selectable gear ratios for altering a transmission ratio between the input shaft and output shaft, and a plurality of hydraulic clutches, each operable to select one of the plurality of selectable gear ratios when actuated, the method comprising:

initiating at least one shift between a first gear ratio selected by a first one of the hydraulic clutches and a second gear ratio selected by a second one of the hydraulic clutches during operation of the machine;

determining a pulse width for a fill pulse usable to fill the second one of the hydraulic clutches based on torque transfer characteristics of the transmission during a shift;

determining a hold level current for the second one of the hydraulic clutches based on a duration of a shift; and executing a subsequent shift between the first and second gear ratios by applying a fill pulse of the determined pulse width to fill the second one of the hydraulic clutches and then applying the derived hold level current, wherein the step of determining a pulse width for a fill pulse usable to fill the second one of the hydraulic clutches further includes determining a plurality of pulse widths respectively usable within each of a plurality of groups of engine speed ranges and wherein the step of determining a hold level current for the second one of the hydraulic clutches further includes determining a plurality of hold level currents respectively usable within each of the plurality of groups of engine speed ranges.

2. The method of claim 1, wherein the groups of engine speed ranges include at least three substantially contiguous non-overlapping rpm ranges which together encompass substantially the entire operating rpm range of the engine.

3. The method of claim 1, wherein determining a pulse width for a fill pulse usable to fill the second one of the hydraulic clutches further includes:

executing a modified shift between the first gear ratio and the second gear ratio such that at least a partial interruption of torque transfer through the transmission occurs during the modified shift; and determining an end of fill time for the second one of the hydraulic clutches based on at least one characteristic of the interruption of torque transfer.

4. The method of claim 3, wherein the step of determining an end of fill time for the second one of the hydraulic clutches further includes:

detecting a flair in the transmission input speed during the interruption of torque transfer and determining the time of occurrence of a peak of the transmission input speed during the flair; and determining an end of fill time for the second one of the hydraulic clutches based on the time of occurrence of the peak of the transmission input speed during the flair.

5. The method of claim 4, wherein the step of determining an end of fill time for the second one of the hydraulic clutches based on the time of occurrence of the peak of the transmission input speed during the flair further includes:

setting a preliminary end of fill time based on the occurrence of the peak of the transmission input speed; and subtracting an offset from the preliminary end of fill time to derive a final end of fill time.

6. The method of claim 1, wherein the step of determining a hold level current for the second one of the hydraulic clutches based on the duration of a shift further includes:

applying a first hold level current during the shift;
calculating at least one indicator of the duration of the shift;
determining whether the calculated at least one indicator is within a predetermined range; and
setting a calibrated hold level current equal to the first hold level current if the at least one indicator is within the predetermined range, and otherwise modifying the first hold level current and repeating the steps of applying, calculating, and determining until the at least one indicator is within the predetermined range.

7. The method of claim 6, wherein calculating at least one indicator of the duration of the shift includes calculating a time difference between attainment of two levels of ratio change during the shift.

8. The method of claim 7, wherein calculating at least one indicator of the duration of the shift includes calculating a linearity measure related to the linearity of the shift.

9. The method of claim 8, wherein the step of determining whether the calculated at least one indicator is within a predetermined range includes determining whether the linearity measure is within a predetermined range.

10. A computer-readable medium having computer-executable instructions for calibrating a transmission associated with a machine, the transmission having an input and an output and a plurality of selectable gear ratios between the input and output, the computer-executable instructions comprising:

instructions for initiating a first test shift and a second test shift between a first gear ratio and a second gear ratio during operation of the machine;

instructions for determining a first shift parameter based on torque transfer characteristics of the transmission during the first test shift; and instructions for determining a second shift parameter based on a duration of the second test shift; and instructions for executing a subsequent shift between the first and second gear ratios by applying the first and second shift parameters, wherein the instructions for determining the pulse width include instructions for executing the first test shift so that at least a partial interruption of torque transfer through the transmission occurs and determining the pulse width based on at least one characteristic of the interruption of torque transfer, and wherein the machine transmission includes a plurality of hydraulic clutches operable to select respective ones of the plurality of selectable gear ratios and wherein the first shift parameter includes a pulse width for a fill pulse usable to fill a selected one of the hydraulic clutches during a subsequent shift, and the second shift parameter includes a hold level current to be applied to the selected one of the hydraulic clutches during the subsequent shift after filling of the selected one of the hydraulic clutches.

11. The computer-readable medium according to claim 10, wherein determining the pulse width based on at least one characteristic of the interruption of torque transfer includes detecting a peak in the transmission input speed during the interruption and determining a calibrated pulse width based on the time of occurrence of the peak.

12. The computer-readable medium according to claim 1, wherein determining the hold level current includes:

applying a first hold level current during the second test shift;
calculating a duration of the second test shift; and
setting a calibrated hold level current equal to the first hold level current if the duration of the second test shift lies within a predetermined range, and otherwise modifying the first hold level current and repeating the steps of applying, calculating, and setting until the duration of the second test shift is within the predetermined range.

13. The computer-readable medium according to claim 12, wherein calculating the duration of the second test shift further includes calculating a linearity measure related to the linearity of the second test shift.

14. An automatically calibrated transmission system for a machine comprising:
- a transmission having an input shaft and an output shaft and a plurality of selectable gear ratios between the input shaft and output shaft;
- a plurality of clutches, each having a piston and being operable to select one of the plurality of selectable gear ratios;
- a plurality of solenoid valves, each solenoid valve being associated with a respective one of the plurality of clutch pistons for controlling the operation of the clutch;
- a control module electrically linked to the plurality of solenoid valves for driving said solenoid valves; and
- a computer-readable memory electrically accessible to the control module and having computer-executable instructions for: initiating a plurality of calibration shifts between a first gear ratio selected by a first one of the clutches and a second gear ratio selected by a second one of the clutches during operation of the machine, calibrating a fill pulse width for the second one of the clutches based on torque transfer characteristics of the transmission during a first shift, and calibrating a hold level current for the second one of the clutches based on a duration of a second shift, wherein the instructions for calibrating the hold level current for the second one of the hydraulic clutches based on the duration of the second shift further include instructions for calibrating the hold level current based at least in part on a linearity of the second shift.

15. The automatically calibrated transmission system according to claim 14, wherein the computer-executable instructions further include instructions for executing a subsequent shift between the first and second gear ratios by applying the calibrated fill pulse width to fill the second one of the hydraulic clutches and subsequently applying the calibrated hold level current to the second one of the hydraulic clutches.

16. The automatically calibrated transmission system according to claim 14, wherein the computer-executable instructions for calibrating a fill pulse width for the second one of the clutches based on torque transfer characteristics of the transmission during a first shift further include instructions for executing the first shift so that at least a partial interruption of torque transfer through the transmission occurs, and detecting a peak in the transmission input shaft speed during the interruption and determining a calibrated pulse width based on the time of occurrence of the peak.

* * * * *